(12) United States Patent
Crandell et al.

(10) Patent No.: US 7,646,859 B2
(45) Date of Patent: Jan. 12, 2010

(54) METHOD AND APPARATUS FOR INTEGRATED TELEPHONE AND INTERNET SERVICES

(75) Inventors: Todd J. Crandell, Frisco, TX (US);
Michael D. Shell, Frisco, TX (US); O. Wayne Heathcock, Frisco, TX (US)

(73) Assignee: StandardCall, LLC, Kirkland, WA (US)

( * ) Notice: Subject to any disclaimer, the term of this patent is extended or adjusted under 35 U.S.C. 154(b) by 0 days.

(21) Appl. No.: 12/288,224

(22) Filed: Oct. 17, 2008
(Under 37 CFR 1.47)

(65) Prior Publication Data

US 2009/0048909 A1   Feb. 19, 2009

Related U.S. Application Data

(63) Continuation of application No. 10/918,715, filed on Aug. 13, 2004, now abandoned.

(60) Provisional application No. 60/498,182, filed on Aug. 25, 2003.

(51) Int. Cl.
*H04M 3/42* (2006.01)

(52) U.S. Cl. ............ 379/201.03; 340/7.1; 379/88.19; 379/135; 379/265.11; 705/7; 705/8; 705/10; 705/65; 707/10

(58) Field of Classification Search ............. 379/88.19, 379/265.01, 88.02, 93.17, 135, 201.03, 265.11; 340/7.1; 705/7, 8, 10, 65; 707/10
See application file for complete search history.

(56) References Cited

U.S. PATENT DOCUMENTS

| | | | |
|---|---|---|---|
| 5,896,445 A * | 4/1999 | Kay et al. | 379/135 |
| 6,400,813 B1 | 6/2002 | Birnhak | |
| 6,526,126 B1 * | 2/2003 | Morganstein et al. | 379/88.02 |
| 6,782,091 B1 | 8/2004 | Dunning, III | |
| 7,005,963 B1 * | 2/2006 | Scalisi et al. | 340/7.1 |
| 7,023,979 B1 * | 4/2006 | Wu et al. | 379/265.11 |
| 7,269,249 B2 * | 9/2007 | Woodring | 379/93.17 |
| 7,587,368 B2 * | 9/2009 | Felsher | 705/65 |
| 2004/0066920 A1 * | 4/2004 | Vandermeijden | 379/88.19 |
| 2004/0117220 A1 * | 6/2004 | Chess et al. | 705/7 |
| 2004/0131164 A1 * | 7/2004 | Gould | 379/88.19 |
| 2004/0162747 A1 * | 8/2004 | Yeh et al. | 705/8 |
| 2004/0260470 A1 | 12/2004 | Rast | |
| 2005/0102292 A1 * | 5/2005 | Tamayo et al. | 707/10 |
| 2006/0008060 A1 * | 1/2006 | Memos | 379/88.19 |
| 2008/0208677 A1 * | 8/2008 | Mayr et al. | 705/10 |

* cited by examiner

*Primary Examiner*—Gerald Gauthier
(74) *Attorney, Agent, or Firm*—Jackson Walker L.L.P.

(57) ABSTRACT

A system and method for providing integrated telephony and Internet services is described. An embodiment of the present invention comprises passively collecting incoming and/or outgoing call information from communications links communicatively coupled to a first party. The call information is extracted and customer information, such as demographic information, is retrieved. The customer information may be, for example, retrieved from a data provider or may have been previously collected or gathered. Thereafter, reports, charts, graphs, maps, and the like may be made available. In an embodiment, the reports, charts, graphs, maps, and the like are made available via a network such as the Internet.

28 Claims, 5 Drawing Sheets

METHOD AND APPARATUS FOR INTEGRATED TELEPHONE AND INTERNET SERVICES

CROSS-REFERENCE TO RELATED APPLICATIONS

This application is a continuation of U.S. patent application Ser. No. 10/918,715, filed on Aug. 13, 2004 now abandoned and claims priority to and the benefit of U.S. Provisional Application No. 60/498,182 filed on Aug. 25, 2003, both applications of which are hereby incorporated by reference.

TECHNICAL FIELD

The present invention relates generally to telecommunications and, more particularly, to a system and method for providing integrated telephony and Internet services.

BACKGROUND

The amount of revenue a business generates is dependent upon the customers the business attracts and how well the business serves the needs of the customers. To better identify the customers and their needs, it is often advantageous for a business to gather demographic information regarding its customers, including geographical and socioeconomic information. By gathering this information, a business is better able to customize its business for its customer base, thereby increasing revenues and decreasing expenses by determining the types of products or services to offer, the market for the products or services, the types of advertising that may be effective, the value of specific types of advertising, and the like.

One attempt to collect customer data has been utilized by businesses that advertise in the advertisement section of the phone book, commonly referred to as the Yellow Pages. In order to help publishers of the Yellow Pages prove the value of advertising in its Yellow Pages and to gather customer data, publishers may install equipment that tracks the response generated due to the advertisement in the Yellow Pages. To do this, the publishers typically assign a "virtual" telephone number to the business. When the virtual telephone number is called, the telephone call is routed to the actual telephone number of the business. In this manner, the publisher may collect caller information when customers call the virtual telephone number. The service enables publishers and businesses (i.e., advertisers) to receive detailed call traffic analysis including date and time of call, call duration, ring duration, source of call (residential or business), disposition of call (answered, busy, no answer), and the name and address of the caller. This information then allows businesses to obtain other socioeconomic data.

This ability, however, is not available or convenient for all businesses or aspects of a business. For example, as described above, the publisher typically assigns a "virtual" telephone number to the business. Many businesses have used and advertised existing telephone numbers for years and may not want to change telephone numbers. Other businesses may not want or need to advertise in the Yellow Pages, but would nonetheless like to obtain, and profit from, the information that may be gathered by such a system that collects information regarding callers. In another example, a business may want to collect information regarding specific aspects of a business, such as a customer service number, a sporting-goods department, or the like. In these cases, a company may not need to advertise the number, but would want to collect caller information to better serve its customers.

Thus, there is a need for a method and an apparatus that allows a business to collect customer information that may be used, for example, to gather marketing and advertising information, customer demographics, and the like.

SUMMARY OF THE INVENTION

These and other problems are generally solved or circumvented, and technical advantages are generally achieved, by preferred embodiments of the present invention which provides a method and apparatus for providing integrated telephony and Internet services.

Embodiments of the present invention provide a system and a method for collecting caller information. In an embodiment, the present invention is utilized to collect customer data regarding callers to a business. In this embodiment, information is extracted from communications links communicatively coupling a business to a telecommunications network. Additional information may be retrieved to provide socio-economic and demographic information. The collected information may then be organized into reports that may be retrieved remotely via a network connection, such as an Internet connection.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a wireline telephony service that provides customer information via an Internet website. The invention may also be applied, however, to other applications and communication systems, services, networks, and the like.

It is further noted that, unless indicated otherwise, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
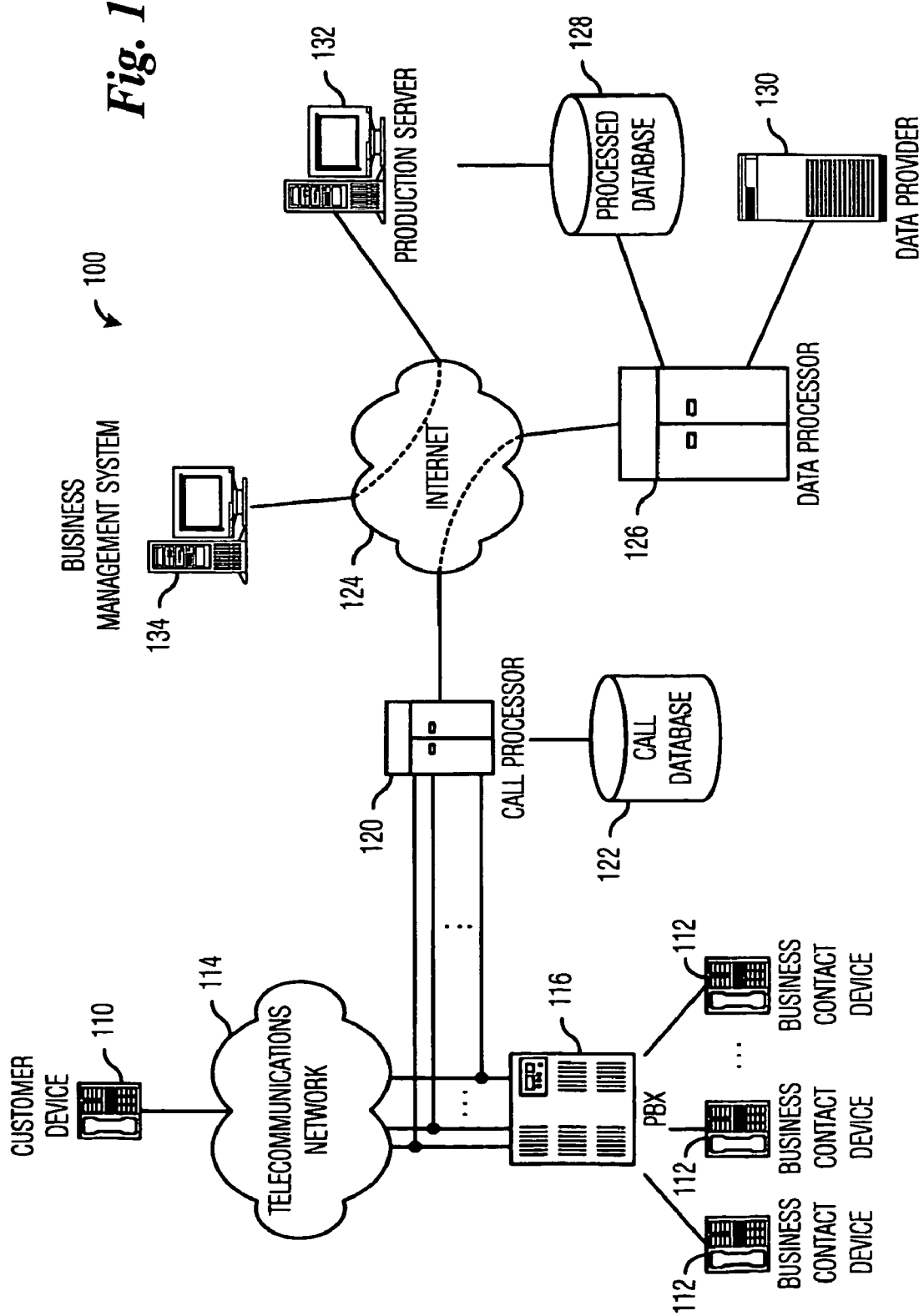
FIG. 1 is a network diagram embodying features of the present invention.

Referring now to FIG. 1, reference numeral 100 designates a network environment embodying features of an embodiment of the present invention. The network environment 100 includes one or more customer devices 110, one or more business contact devices 112, a telecommunications network 114, a private branch exchange (PBX) 116, a call processor 120, a call database 122, the Internet 124, a data processor 126, a processed database 128, a data provider 130, a production server 132, and a business management system 134.

The customer device 110 is configured to communicatively couple to the telecommunications network 114, such as the Public-Switched Telephone Network (PSTN), a wireless communications network, a combination thereof, or the like. The customer device 110 may be, for example, any suitable access device that may be configured to communicate via the telecommunications network 114, such as a wireline phone, wireless phone, laptop computer, desktop computer, tablet personal computer, Personal Data Assistant (PDA), or the like. The customer device 110 may be configured to utilize any suitable communications signaling and/or protocol, such as DTMF, CDMA, TDMA, ISDN, GSM, or the like. It is noted that a user (not shown) operates the customer device 110. Accordingly, the customer device 110 includes a user or an automated system providing input to and receiving output from the customer device 110.

The telecommunications network 114 is further communicatively coupled to the PBX 116. As one skilled in the art will appreciate, the PBX 116 provides a business with call switching and routing capabilities. Typically, the PBX 116 is coupled to the telecommunications network 114 via one or more communications lines, wherein the communications lines may be, for example, single two-wire telephone lines, T-1 lines, fiber optic lines, ISDN, wireless links, or the like. The PBX 116 routes calls received from the customer device 110 to the appropriate business contact device 112.

It should be noted that in the embodiments described herein, the business contact device 112 is associated with a business and may be, for example, any suitable access device that may be configured to communicate via the PBX 116 and/or the telecommunications network 114, such as a wireline phone, wireless phone, laptop computer, desktop computer, tablet personal computer, Personal Data Assistant (PDA), or the like. The business contact device 112 may be configured to utilize any suitable communications signaling and/or protocol, such as DTMF, CDMA, TDMA, ISDN, GSM, or the like. It should also be noted that the business may be any business, business entity, division, group, individual, or the like interested in collecting information regarding calls placed to or from the business, business entity, division, group, individual, or the like. For example, embodiments of the present invention may be used to collect information regarding incoming calls to a business, monitor outgoing calls for performance and compliance statistics for a business, or the like.

The call processor 120 and the call database 122 may be a stand-alone processing system that is communicatively coupled to the PBX 116 and the telecommunications network 114 via one or more communications links. It should be noted that the call processor 120 and the call database 122 are illustrated as two distinct elements for illustrative purposes only. Accordingly, the call processor 120 and the call database 122 may be separate components or integrated into a single component. For example, in an embodiment, the call database 122 is implemented as memory (e.g., flash memory) integrated into the call processor 122. In another embodiment, the call database 122 may be a separate, stand-alone database system such as a storage device, a redundant array of inexpensive disks (RAID), or the like.

Preferably, the call processor 120 is communicatively coupled to the communication link or links communicatively coupling the telecommunications network 114 to the business contact device 112, preferably via the PBX 116 as illustrated in FIG. 1. One method of communicatively coupling the call processor 120 to the communications link in an embodiment in which the PBX 116 is communicatively coupled to the telecommunications network 114 via one or more twisted pairs, is through the use of a punch-down block. A punch-down block provides a series of connections that can be configured to split a line communicatively coupled to the telecommunications network 114 into two lines—one line to the PBX 116 and one line to the call processor 120. In this manner, the call processor 120 has access to all information contained in an incoming or outgoing call and is independent of any processing that the PBX 116 may perform. In this embodiment, the call processor 120 may utilize standard communications protocols, such as DTMF and the like, to communicate with the telecommunications network 114 and the PBX 116. In another embodiment, the call processor 120 may be configured to retrieve information regarding voice-over-IP (VoIP) calls.

As discussed above, the call database 122 may be an external or internal database system having sufficient processing power and storage capacity as required by the particular application and expected call volume. Suitable databases include flat files, Sybase, Oracle, Informix, other databases, and the like. As will be described in greater detail below, the data stored on the call database 122 may be periodically moved to another database, thereby reducing the storage requirements of the call database 122. The call database 122 may be communicatively coupled to the call processor 120 via a standard internal bus, serial link, parallel link, USB connection, or the like. The call database 122 may also be integrated into the call processor 120, such as memory installed or integrated in the call processor 120.

In an embodiment, the call processor 120 is configured to passively monitor call traffic between the PBX 116 and the telecommunications network 114 and to extract call information from incoming and/or outgoing calls. The call information may include, for example, a caller identifier, a call duration, a call time, a call result, a call date, a business or residential line indicator, a mobile or pay phone indicator, a MAC address, a computer address, a port status, a termination identifier, or the like. The call information may also include audio recordings, DTMF interactions, and the like. The call processor 120 stores the collected call information in the call database 122 for later processing.

The call processor 120 is further communicatively coupled to the Internet 124 (or some other network). The Internet 124 provides communications and access services between the call processor 120 and the data processor 126. As is known in the art, the Internet 124 allows a user or system to access data on a remote device. In this embodiment, the Internet 124 is utilized to allow the data processor 126 to access call information stored on the call database 122 by the call processor 120. It is noted that the Internet 124 utilizes the telecommunications network 114 as the infrastructure, but is shown in FIG. 1 as two distinct elements for illustrative purposes only.

Preferably, the call processor 120 and the data processor 126 are communicatively coupled to the Internet 124 utilizing standard communications links, such as a wireline link (Ti, twisted pair, fiber optic, and the like) or a wireless link (Bluetooth, satellite, WiFi, and the like) using standard communications protocols, such as TCP/IP, WAP, UDP, HTTP, FTP, SMTP, Telnet, SFTP, and the like. In the preferred embodiment, however, the call processor 120 is communicatively coupled to the Internet 124 via one or more twisted-pair communications links, such as a DSL or ISDN link, and the data processor 126 is communicatively coupled to the Internet 124 via a broadband communications link such as a T-1 link. In this manner, one data processor 126 may handle multiple call processors 120 located at various sites or located with multiple customers.

It should be noted, however, that the Internet 124 may alternatively be a local-area network (LAN), a wide-area network (WAN), a Public-Switched Telephone Network (PSTN), a wireless communications network, a direct connection, or the like.

The data processor 126 is configured to periodically retrieve (or receive) call information from the call database 122 (via the Internet 124 and the call processor 120) and to process the data and store the processed data in the processed database 128. Generally, as will be described in greater detail below, the data processor 126 receives the call information and processes the data to provide meaningful data and statistics to the client. The processing may include, for example, reformatting the call information, grouping the call information, calculating statistics from the call information, and the like.

In addition, the data processor 126 may retrieve information from the data provider 130, which may provide additional information, such as, for example, demographic information (address, income range, and the like) corresponding to the location or owner of the customer device 110. It should be noted that the data provider 130 may be a third-party provider and may be accessed via a direct link, a network connection, an Internet connection, or the like, using standard communications protocols. In the preferred embodiment, the data provider 130 is accessed via the Internet 124 using standard communications protocols.

In an embodiment, the data processor 126 may be an FTP server that may be configured to automatically retrieve information stored in the call database 122 via the file transfer protocol (FTP). FTP is a common protocol used over the Internet to transfer files from one machine to another machine. Other protocols may be used.

The production server 132 provides access capabilities to the processed database 128. While FIG. 1 illustrates two distinct communications links coupled to the processed database 128, it should be understood that the data processor 126, the processed database 128, and the production server 132 may be communicatively coupled to a network, such as a LAN, WAN, SAN, or the like, and may be integrated into one or more components.

In the preferred embodiment, the production server 132 provides access to the processed database 128 via an Internet web page accessible by the business management system 134 located at a remote location. In this manner, the business management system 134 may be any Internet-enabled device and may access the processed database 128 from a remote location using standard communications links and protocols as is known in the art. In other embodiments, however, access to the processed database 128 may be gained via a LAN, WAN, virtual LAN (VLAN), or the like. It should be appreciated that these types of networks also provide remote access to the processed database 128.

Figure 2:
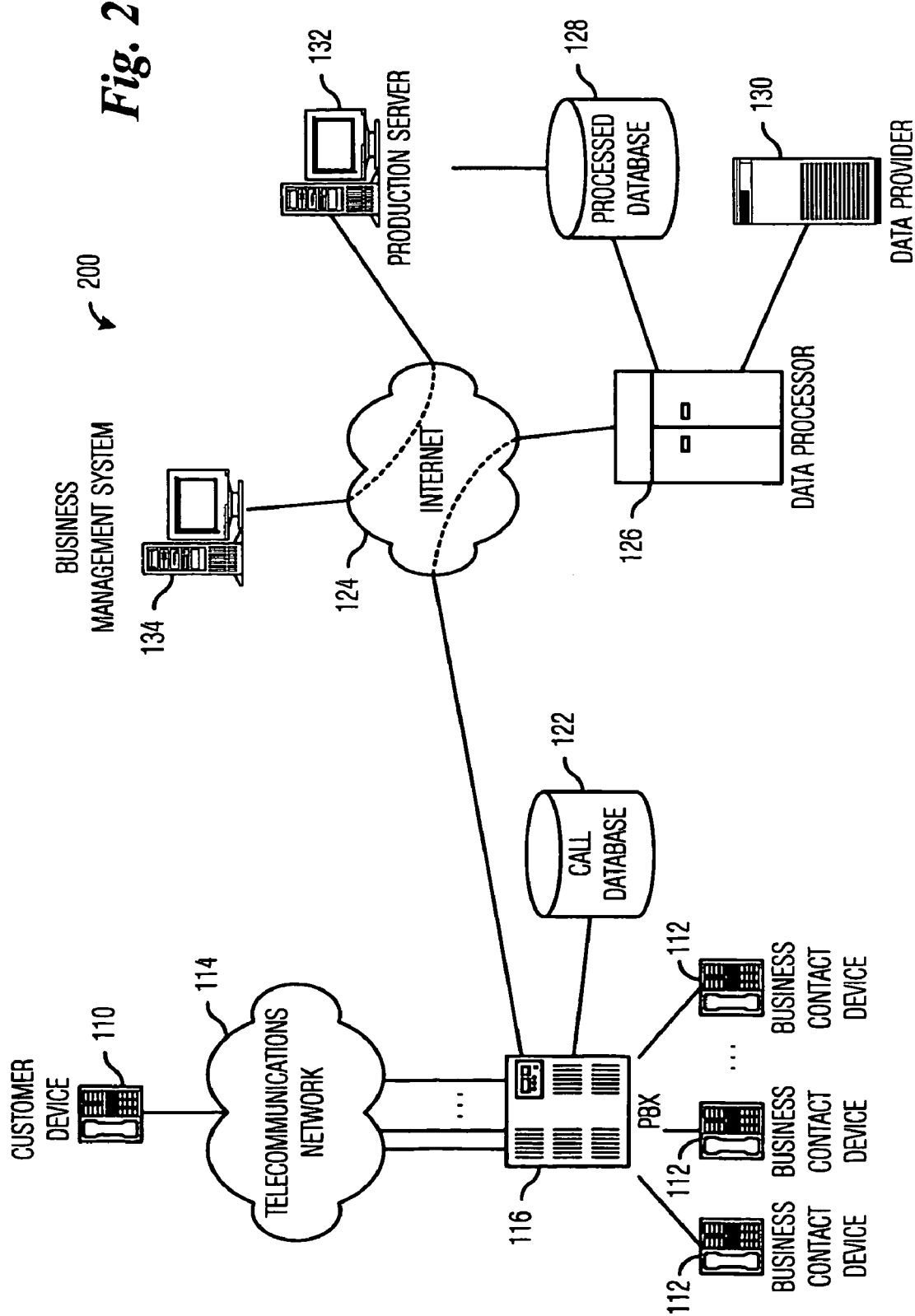
FIG. 2 is a network diagram embodying features of the present invention.

FIG. 2 illustrates a second network environment 200 that embodies features of an embodiment of the present invention. FIG. 2 is similar to FIG. 1 where like reference numerals refer to like elements, except that the call processor 120 (FIG. 1) has been incorporated into the PBX 116. In this embodiment, the functions of the call processor 120 are preferably incorporated onto one or more cards that may be inserted into the card cage of the PBX 116. A line card (not shown) may be placed in the PBX to split the communications links similar to a punch-down block in the first embodiment.

Furthermore, it is noted that the call database 122 is shown as an external database for illustrative purposes only. Accordingly, the call database 122 may be an external database or incorporated onto one or more cards placed into the PBX 116. The call database 122 may also be integrated onto the same board as the call processor 120, such as incorporating memory onto the board of the call processor 120.

Figure 3:
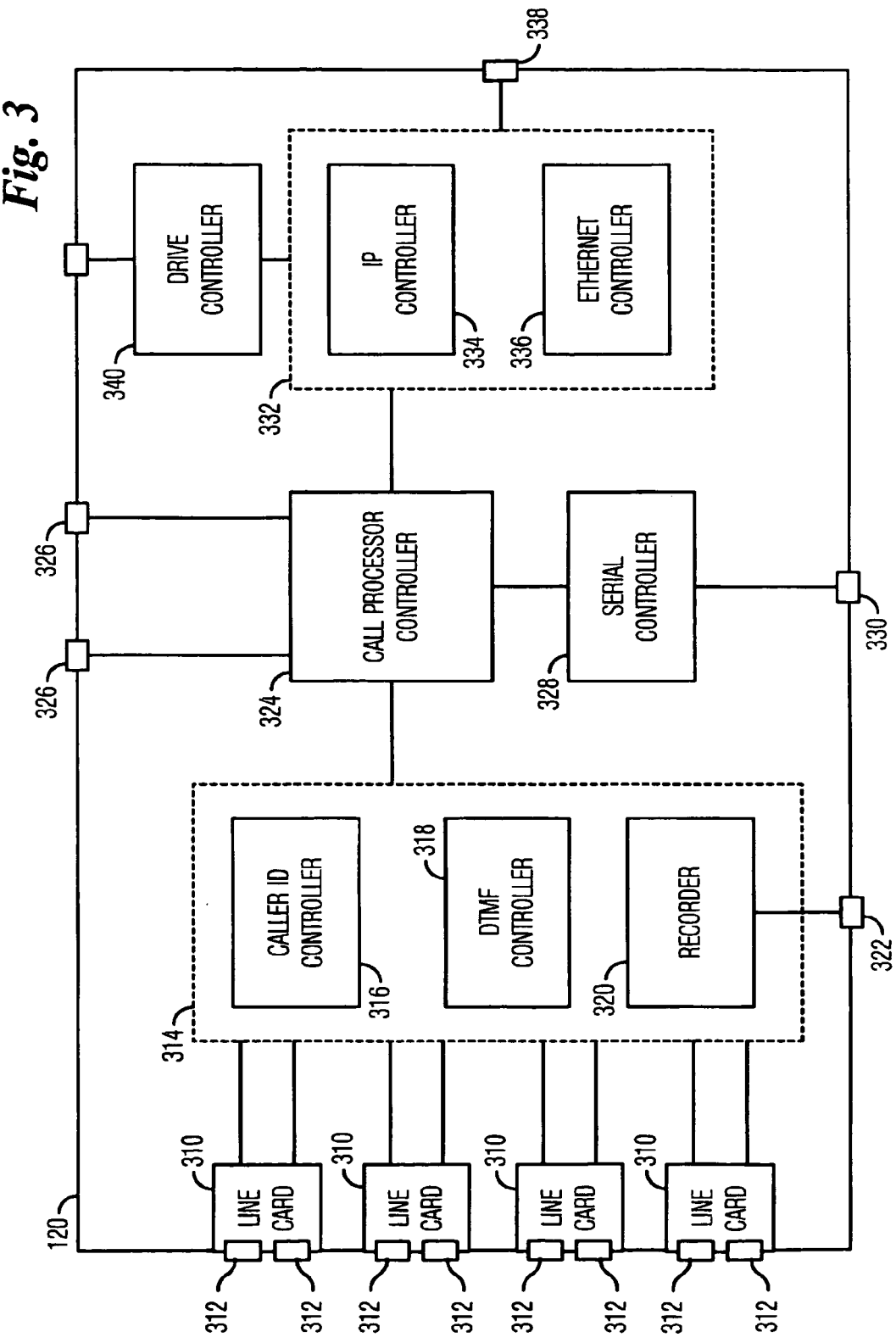
FIG. 3 is a block diagram of a call processor in accordance with an embodiment of the present invention.

FIG. 3 is a block diagram illustrating components of the call processor 120 in accordance with an embodiment of the present invention. The call processor 120 includes one or more line cards 310. Each line card 310 may have one or more ports 312 configured to be communicatively coupled to the communications links communicatively coupling a business to the telecommunications network 114 (FIGS. 1-2). In an embodiment, each line card 310 includes two RJ-11 jacks, which are commonly used in the industry to provide electrical connections to one or two twisted-pair communications lines. In the embodiment illustrated in FIG. 3, the call processor 120 is configured with four line cards 310, wherein each line card 310 provides two ports 312. Thus, the call processor 120 illustrated in FIG. 3 is configured to connect simultaneously to eight communications links Each line card 310 is communicatively coupled to a line controller 314. Generally, the line controller 314 is responsible for collecting incoming and outgoing call information on the communications links coupled to the line cards 310. Additionally, in some embodiments, the line controller may play DTMF tones or audio recordings on the communications links.

In an embodiment, the line controller 314 may include a caller ID controller 316, a DTMF controller 318, and/or a recorder 320. The caller D controller 316 retrieves caller identification information, such as the phone number of the calling party, from the analog signal.

The DTMF controller 318 decodes DTMF information on incoming and outgoing calls on the communications links coupled to the line cards 310. The DTMF information may include, for example, calling party digits, called party digits, menu selections, account information, credit card information, and the like. It should be noted that in an embodiment of the present invention, the call processor 120 passively monitors the communications links. In this embodiment, the DTMF controller 318 only decodes DTMF information on incoming and outgoing calls and is not required to generate DTMF signals. In other embodiments, however, it may be desirable for the DTMF controller 318 to be configured to generate DTMF tones. For example, it may be desirable to play a tone on one or more of the communications links to indicate the occurrence of an event, such as receiving an incoming call, placing a blocked call, duration of the call, and the like.

The DTMF controller 318 preferably provides line circuitry having a high impedance and active signal processing. This may be particularly useful in poor telephonic environments, such as poor grounding environments and the like. Alternatively, the DTMF controller 318 may utilize a passive RC network.

The recorder 320 provides the ability to record incoming and/or outgoing calls on the communications links coupled to the line cards 310. One particular useful situation for this ability is the ability to record calls for training purposes. A trainee may conduct one or more customer calls which may be recorded. After the call is complete, the calls may be reviewed by the trainee and a training supervisor. In another useful situation, calls may be recorded insuring accurate completion of customer requests, such as brokerage orders, telephone sales, and the like.

In an embodiment, the recorder 320 stores the recorded information in memory or disk storage within the call processor 120. The recorded information may be stored as analog data, or converted to digital information by an analog-to-digital (A/D) converter and stored as digital data. In this embodiment, the recorded information may be retrieved or accessed via any of the ports discussed below, including the ability to access the recorded information via an Internet connection. In another embodiment, the recorder 320 is communicatively coupled to a communications port 322. The communications port 322 may be an audio jack for listening to audio playback, a data port for receiving analog or digital data to be recorded or played, or the like.

The line controller 314 is further communicatively coupled to a call processor controller 324. The call processor controller 324 may comprise a micro-controller that is configured to perform the operating system and the application programs. Additionally, as discussed above, the call processor controller 324 may include memory (e.g., flash memory) for storing the call information received from the line controller 314. Preferably, the call processor controller 324 receives digital information, including caller identification information, DTMF information, and/or the like, from the line controller 314 and makes the information available to a web server 332.

The call processor controller 324 may also be communicatively coupled to external ports 326, such as a USB port, a parallel port, or the like. The external ports 326 allow the controller 324 to communicate to an external system. In an embodiment, the external ports are communicatively coupled to the PBX 116 (FIGS. 1-2). In this embodiment, the call processor controller 324 may receive, for example, station-messaging detail record (SMDR) data from the PBX 116. Once collected, the data may be made available with other recorded call information as discussed below.

The call processor 324 may also be communicatively coupled to a serial controller 328, which provides a serial port 330. The serial controller 328 and the serial port 330 may be used to couple a maintenance panel or terminal to the call processor 120. Software upgrades, performance monitoring, disk allocation, memory allocation, configuration, and the like may be performed via the serial port 330 and the serial controller 328.

The web server 332 includes an IP controller 334 and an Ethernet controller 336, providing Internet access to data collected by the call processor 120. The IP controller 334 manages the IP addressing and protocols necessary to support an Internet web server. In a preferred embodiment, the IP controller 334 provides an FTP site from which the data collected by the call processor 120 may be retrieved via the Internet.

It should be noted that in a preferred embodiment, the IP controller 334 includes sufficient memory (e.g., flash memory) to hold a predetermined number of call records and other data. For example, in one embodiment the IP controller 334 contains flash memory sufficient to store 9,000 call records. The information is retrieved or sent periodically to a data processor 126 (FIGS. 1 and 2), after which the flash memory may be erased and/or reused to store additional data.

In an alternative embodiment, an external database, such as call database 122 (FIGS. 1 and 2), may be used to store the call records and other data. A drive controller 340 may be desirable to provide access support and connectivity to the external database.

The Ethernet controller 336 provides a physical network interface via a network port 338 and performs the electrical signaling related to the Ethernet connection. The network port 338 may comprise an RJ-45 jack that is commonly used in the industry for network connectivity.

Figure 4:
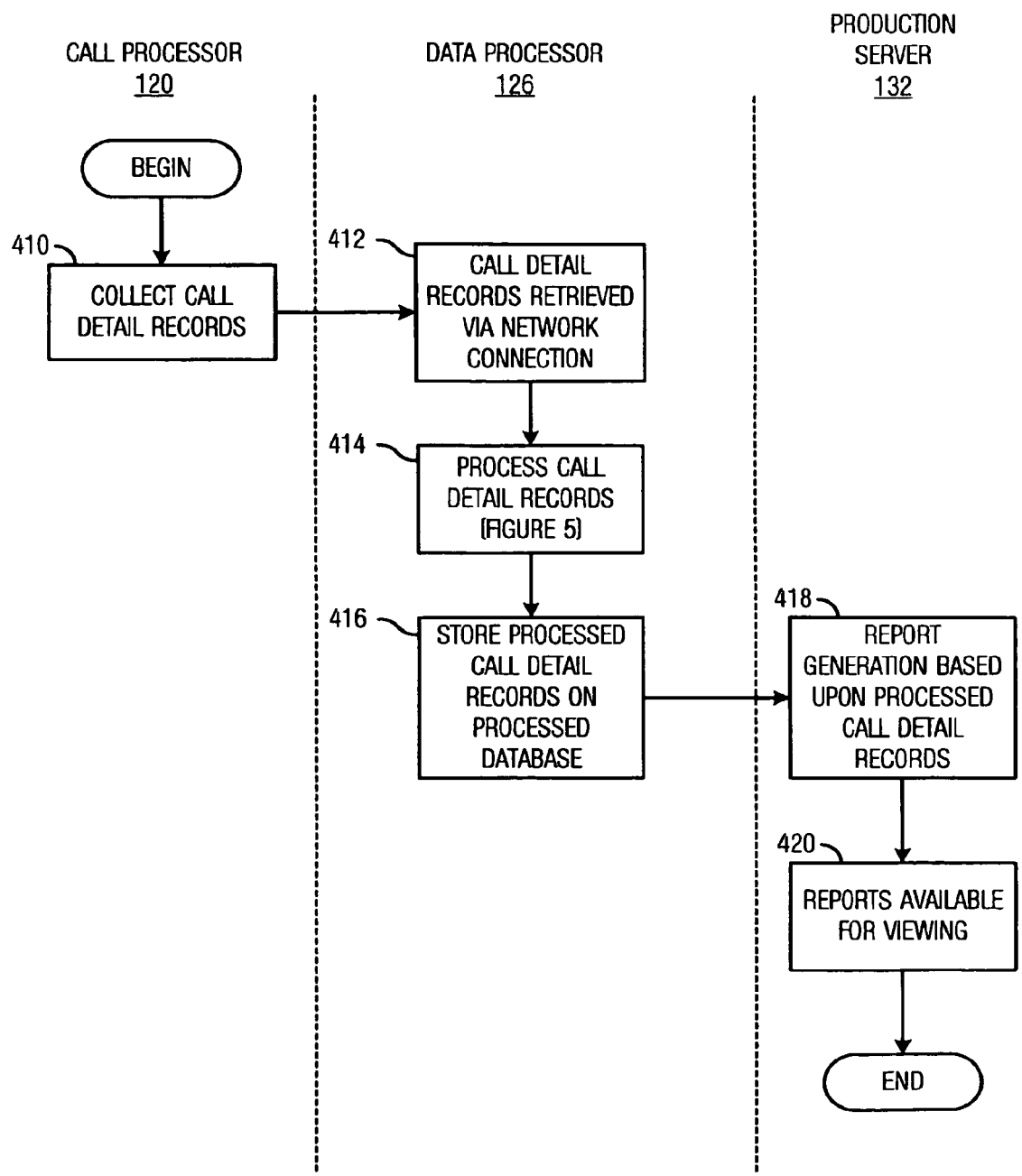
FIG. 4 is a data flow diagram depicting steps that may be performed in accordance with an embodiment of the present invention.

FIG. 4 is a data flow diagram illustrating steps that may be performed to collect caller information in accordance with an embodiment of the present invention. It should be noted that the data flow depicted in FIG. 4 is divided into three columns, wherein each column depicts the element that may perform the functions in that column in an embodiment of the present invention. The left-most column depicts functions that may be performed by the call processor 120 (FIG. 1), the center column depicts functions that may be performed by the data processor 126 (FIG. 1), and the right-most column depicts functions that may be performed by the production server 132 (FIG. 1). It should be noted that while the following discussion assumes the network environment illustrated in FIG. 1, one of ordinary skill in the art will realize that the discussion is equally applicable to other network environments, such as the network environment illustrated in FIG. 2.

It should also be noted, however, that the functions may be performed by other components, performed by fewer components, performed by a single component, performed by additional components, or the like. For example, in an embodiment, the call processor 120, data processor 126, and production server 132 may be integrated into a single component. In such an embodiment, all of the functions described in FIG. 4 may be performed by a single component. Furthermore, it should be understood that additional or fewer steps and processes may be performed. The steps described in FIG. 4 are only provided to further the understanding of an embodiment of the present invention.

The processing begins in step 410, wherein information is collected regarding incoming calls, i.e., calls placed to one or more of the business contact devices 112, and/or outgoing calls, i.e., calls placed by one or more of the business contact devices 112. The call processor 120 stores the call detail records, e.g., call information regarding incoming and/or outgoing calls, in the call database 122.

One example of a situation in which this embodiment may be useful is a business collecting marketing data regarding potential and existing customers. In this embodiment, a call is initiated by the customer contact device 110. A communications link is established to the telecommunications network 114 and the PBX 116, which may then route the call to the appropriate business contact device 112. The call processor 120 detects the incoming call and extracts call information. The call information may include a caller identifier, a call result, a call date, a business or residential line indicator, a mobile or a pay phone indicator, a MAC address, a computer address, a port status, a termination identifier, or the like. Other call information, such as call duration, a call time, and the like, may be derived.

In another embodiment, the call processor 120 detects that an outgoing call is being placed by one or more of the business contact devices 112. In this embodiment, the call processor 120 extracts information regarding the called number. The information regarding the called number may include, for example, a call identifier, a called number, a call result, a call date/time, a business or residential line indicator, a mobile or a pay phone indicator, a MAC address, a computer address, a port status, a termination identifier, call duration, or the like. This type of information may be useful in determining or assuring compliance with various no-call laws. Other information may also be collected.

Next, in step 412, the call detail records are transferred from the call processor 120 (and the call database 122) to the data processor 126. In an embodiment, the data processor 126 periodically retrieves the call detail records from the call processor 120 and the call database 122 via the Internet 124. The frequency of retrieving the stored call information from the call database 122 may vary, depending upon the volume of stored call information, the size of the call database 122, and the need of an application to have the most recent data available.

Furthermore, it should be noted that any of the call processor 120, the data processor 126, the production server 132, the business (via the business management system 134, for example), or the like may initiate the data transfer. For example, in an embodiment, the call processor 120 initiates the call detail record transfer based upon the number of call detail records collected, a set time period, an elapsed time, a combination thereof, or the like. In another embodiment, the production server 132 and/or the data processor 126 may initiate or instruct the transfer to occur based upon an event (e.g., a customer request), a periodic interval, an elapsed time, a combination thereof, or the like. In yet another embodiment, a business may request that the data be updated, such as to see the interim effect of a print ad in a daily newspaper, or the like.

Once retrieved the data processor 126 processes the data and stores the results in the processed database 128 in step 414. The processing of the call detail records may include, for example, calculating statistical data, collecting demographic information, creating maps and reports, and the like. Generally, the call detail records are processed by retrieving, possibly from third-party data providers, additional customer information associated with the customer device 110. A process that may be performed to process the call detail records is discussed in greater detail below with reference to FIG. 5.

In step 416, the processed call detail records are stored in the processed database 128, which is then available for processing to generate the reports, charts, graphs, etc. desired by the business. In an embodiment, the production server 132 generates a series of reports based upon the call detail records in step 418 and makes those reports available for viewing in step 420. Reports may be categorized as standard reports and custom reports. Standard reports are considered reports that may be automatically generated for a business on a regular basis. The reports may be made available to the business for viewing via the Internet (preferably via a secure access method), emailed, faxed, or printed for mailing.

In another embodiment, however, the business may access the production server 132 to create custom reports, charts, graphs, or the like. For example, a business may be interested in a particular area code, zip code, geographical boundaries, or the like. It should be appreciated that the availability of the processed call detail records in the processed database 128 and the access to the processed database 128 via the production server 132 provides numerous reporting and data viewing possibilities. Furthermore, the use of a standardized database for use with the processed database 128 also allows the use of third-party report generation tools to easily extract reports, graphs, charts, or the like in the desired format.

Figure 5:
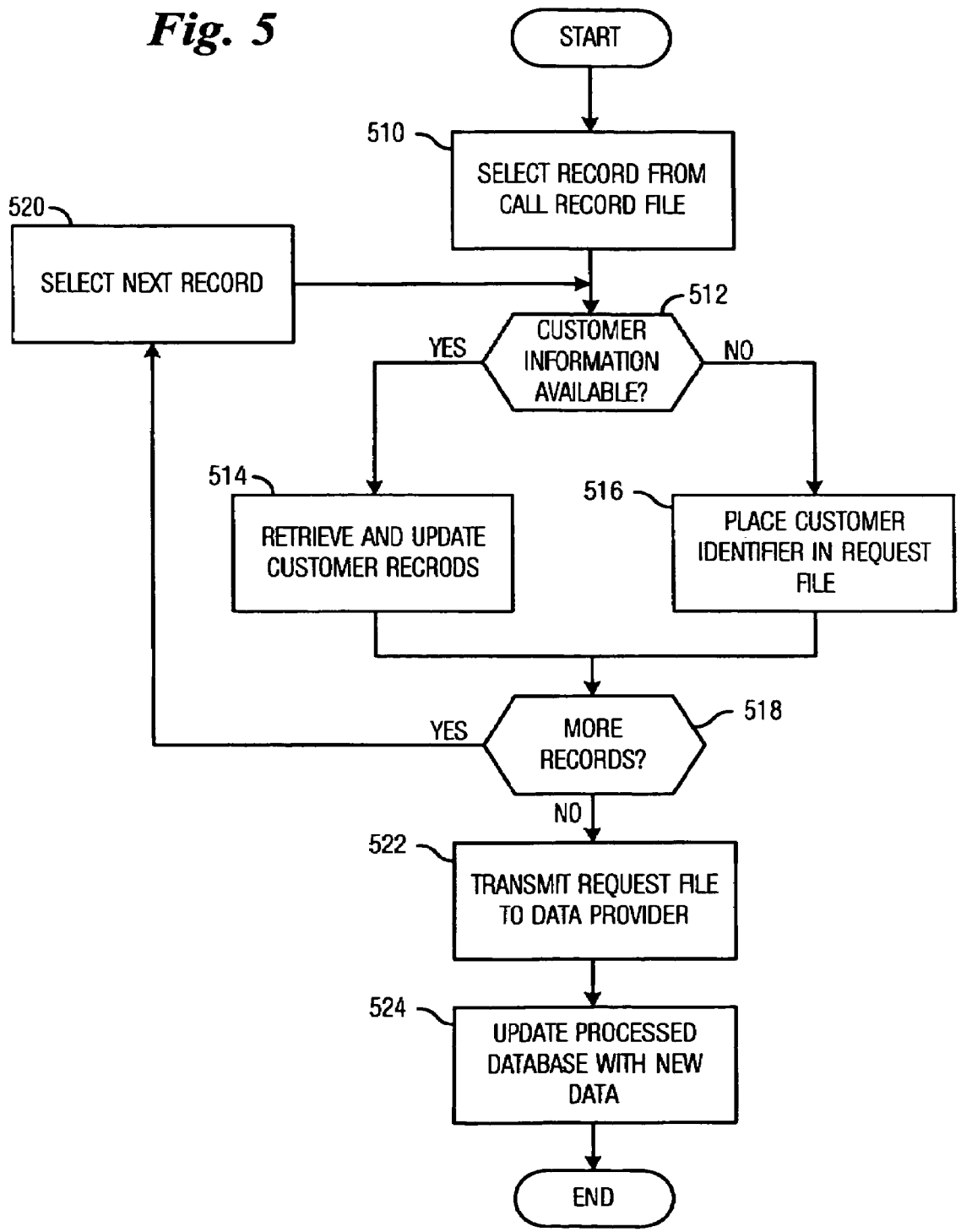
FIG. 5 is a data flow diagram depicting steps that may be performed in accordance with an embodiment of the present invention.

FIG. 5 is a data flow diagram depicting steps that may be performed to process the call detail records in accordance with an embodiment of the present invention. In particular, FIG. 5 depicts steps that may be performed in step 414 of FIG. 4. Thus, after performing step 412 of FIG. 4, processing proceeds to step 510 of FIG. 5, and after performing the steps depicted in FIG. 5, processing returns to step 416 of FIG. 4.

In step 510, a record is selected from the call detail records received, for example, from the call processor 120. Next, in step 512, a determination is made whether or not the customer information is available corresponding to the selected call detail record. In some situations, it may be desirable to retrieve additional information in addition to the information included in the call detail records. For example, it may be desirable to retrieve information such as age bracket, income bracket, own/rent, and the like. This information is not typically included in the call detail record and is obtained by another method. The additional information may be previously retrieved and stored, such as in the processed database 128, or the additional information may need to be retrieved from, for example, a third-party data provider.

Accordingly, the determination made in step 512 determines if the additional information is available. If a determination is made that customer information is available, then processing proceeds to step 514, wherein the customer information is retrieved and/or updated. Generally, the processed database 128 may be updated to reflect that a particular customer has contacted the business. This may be performed in a number of ways. For example, the processed database 128 may be organized such that each customer has one or more records and that, when a customer contacts the business, one or more entries in the record or records are updated to reflect the new contact, such as updating the time, the call result, the call duration, and the like. In another example, the processed call database 128 may comprise call detail records of incoming and/or outgoing calls. In this example, the processed database 128 may be updated to reflect that a call associated with a specific customer has occurred and the information corresponding to the specific customer may be entered into the call detail record. Other database structures may be used.

If on the other hand a determination is made in step 512 that the information is not available, processing proceeds to step 516, wherein a customer identifier is placed into a request file. The request file includes identifiers of the customers that additional information is desired. The customer identifier may be any identifier used to uniquely identify a customer. In an embodiment, the customer identifier is the telephone number of the customer.

After steps 514 and 516, processing proceeds to step 518, wherein a determination is made whether or not additional call detail records exist for processing. If a determination is made that additional call detail records exist to process, then processing proceeds to step 520, wherein a next call detail record is selected for processing.

If, in step 518, a determination is made that all of the call detail records have been processed, then processing proceeds to step 522, wherein the request is transmitted to the data provider (e.g., a third-party data provider). For example, third-party data providers are available that provide addresses and other demographic information given a phone number. This feature may be particularly useful for businesses gathering information regarding customers and potential customers to target marketing efforts. Thereafter, the processed database 128 is updated in step 524.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. As another example, it will be readily understood by those skilled in the art that the functionality described herein may be performed by fewer or more varied components while remaining within the scope of the present invention. Additionally, one skilled in the art will realize that the type of information gathered, retrieved, and stored may vary while remaining within the scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of providing customer information to a company, the method comprising the steps of:
    (a) automatically extracting a first caller identifier from an incoming call wherein the step of automatically extracting is performed by passively monitoring a plurality of incoming telecommunications links to the company;
    (b) comparing the first caller identifier with a list of previously received caller identifiers from a call database;
    (c) retrieving customer information from a data provider wherein the customer information corresponds to the first caller identifier, when the first caller identifier does not match a caller identifier included in the list of previously received caller identifiers, wherein the customer information further comprises demographic information associated with the first caller identifier;
    (d) automatically extracting call information from the incoming call;
    (e) storing the call information and the customer information in a call record in the call database wherein the call record corresponds to the first caller identifier;
    (f) performing steps (a)-(e) a plurality of times for a plurality of callers to generate a plurality of call records in the call database; and
    (g) generating a report based on the call information and the customer information stored in the plurality of call records in the call database.

2. The method of claim 1 wherein the first caller identifier is a caller identifier associated with the incoming call.

3. The method of claim 1 wherein the first caller identifier is a computer address.

4. The method of claim 1 wherein the call information includes one or more of a caller identifier, a call duration, a call time, a call result, a call date, a business or residential line indicator, a mobile phone or pay phone indicator, a computer address, a port status, and a termination identifier.

5. The method of claim 1 further comprising adjusting marketing advertising campaigns based on the report.

6. The method of claim 1 wherein the demographic information is an age bracket, an income bracket, or an address.

7. The method of claim 5, further comprising making the report available via an Internet web page.

8. The method of claim 5 wherein step (a) is performed by extracting the first caller identifier from a PBX.

9. The method of claim 5 wherein step (b) comprises uploading the first caller identifier from a database located at a customer site to a central database.

10. The method of claim 9 wherein the data provider is a third-party data provider.

11. The method of claim 5 wherein step (g) comprises providing information that includes generating one or more reports comprising return-on investment, calls placed, calls received, demographic information, calls per hour, call details, call status, call results, or SMDR reports.

12. The method of claim 5 further comprising recording the incoming call to generate an audio recording and storing the audio recording in the call database.

13. The method of claim 5 further comprising recording DTMF interactions during the incoming call and storing the DTMF interactions in the call database.

14. The method of claim 5 wherein step (d) occurs throughout the duration of the incoming call.

15. An apparatus to provide call information to a company, the apparatus comprising:
    a telephone network connector configured to communicatively couple to a communications link, the communications link being communicatively coupled to a telephone network wherein the telephone network connector is configured to passively monitor traffic on the communications link;
    an Internet connector configured for providing Internet access; and
    a call processor configured to:
        automatically extract caller information from an incoming call on the communications link, the caller information including a first caller identifier, wherein the step of automatically extracting is performed by passively monitoring the plurality of incoming telecommunications links to the company;
        retrieve customer information corresponding to the first caller identifier from a call database;
        automatically extract call information from the incoming call;
        store the call information and the customer information in a call record in the call database wherein the call record corresponds to the first caller identifier;
        automatically recording DTMF interactions during the incoming call and storing the DTMF interactions in the call record in the call database;
        generate a report based on the plurality of call records in the call database; and
        provide access to the report on the Internet via the Internet connector.

16. The apparatus of claim 15, wherein the processor is configured to retrieve the customer information from a third-party data provider.

17. The apparatus of claim 15, wherein the processor is configured to retrieve the customer information from a local database.

18. The apparatus of claim 15, wherein the telephone network connector comprises a PBX.

19. The apparatus of claim 15, wherein the call information includes one or more of a caller identifier, a call duration, a call time, a call result, a call date, a business or residential line indicator, a mobile phone or pay phone indicator, a computer address, a port status, and a termination identifier.

20. The apparatus of claim 15, wherein the processor is further configured to extract outgoing call information for outgoing calls.

21. The apparatus of claim 20, wherein the outgoing call information includes one or more of a caller identifier, a call duration, a call time, a call result, a call date, a business or residential line indicator, a mobile phone or pay phone indicator, a computer address, a port status, and a termination identifier.

22. The apparatus of claim 15, wherein the processor is configured to retrieve the call information from a third-party provider via the Internet connector.

23. The apparatus of claim 15, wherein the processor is further configured to extract call information from a voice over IP call.

24. The apparatus of claim 15 wherein the customer information comprises demographic information associated with the first caller identifier.

25. The apparatus of claim 24 wherein the demographic information is an age bracket, an income bracket, or an address.

26. The apparatus of claim 15 wherein the report comprises data from one or more of return-on investment, calls placed, calls received, demographic information, calls per hour, call details, call status, call results, or SMDR reports.

27. The apparatus of claim 15 wherein the processor is further configured to record the incoming call to generate an audio recording and storing the audio recording in the call database.

28. A method of providing customer information to a company, the method comprising the steps of:
 (a) automatically extracting a first caller identifier from an incoming call wherein the step of automatically extracting is performed by passively monitoring a plurality of incoming telecommunications links to the company;
 (b) comparing the first caller identifier with a list of previously received caller identifiers from a call database;
 (c) retrieving customer information from a data provider wherein the customer information corresponds to the first caller identifier, when the first caller identifier does not match a caller identifier included in the list of previously received caller identifiers;
 (d) automatically extracting call information from the incoming call, wherein the call information comprises one or more of a call duration, a call time, a call result, a call date, a business or residential line indicator, a mobile phone or pay phone indicator, a computer address, a port status, and a termination identifier;
 (e) storing the call information and the customer information in a call record in the call database wherein the call record corresponds to the first caller identifier;
 (f) recording the incoming call to generate an audio recording and storing the audio recording in the call record in the call database;
 (g) performing steps (a)-(e) a plurality of times for a plurality of callers to generate a plurality of call records in the call database; and
 (h) generating a report based on the call information and the customer information stored in the plurality of call records in the call database.

* * * * *